(12) United States Patent
Chen et al.

(10) Patent No.: US 8,768,131 B2
(45) Date of Patent: Jul. 1, 2014

(54) MULTIMODE FIBER WITH AT LEAST DUAL CLADDING

(75) Inventors: Xin Chen, Corning, NY (US); Ming-Jun Li, Horseheads, NY (US); Daniel Aloysius Nolan, Corning, NY (US)

(73) Assignee: Corning Incorporated, Corning, NY (US)

( * ) Notice: Subject to any disclaimer, the term of this patent is extended or adjusted under 35 U.S.C. 154(b) by 824 days.

(21) Appl. No.: 12/534,410

(22) Filed: Aug. 3, 2009

(65) Prior Publication Data

US 2010/0040336 A1 Feb. 18, 2010

Related U.S. Application Data

(60) Provisional application No. 61/088,490, filed on Aug. 13, 2008.

(51) Int. Cl.
*G02B 6/028* (2006.01)
*G02B 6/036* (2006.01)

(52) U.S. Cl.
CPC ........ *G02B 6/03627* (2013.01); *G02B 6/03666* (2013.01)
USPC .......................................... 385/126; 385/124

(58) Field of Classification Search
CPC .................................................. G02B 6/03627
USPC .................................................. 385/123–128
See application file for complete search history.

(56) References Cited

U.S. PATENT DOCUMENTS

| 4,184,744 A * | 1/1980 | Onoda et al. ................. 385/127 |
| 4,185,890 A | 1/1980 | Onoda et al. ............... 350/96.33 |
| 4,715,695 A | 12/1987 | Nishimura et al. ......... 350/96.31 |
| 5,418,882 A | 5/1995 | Ortiz, Jr. ...................... 385/124 |
| 7,366,386 B2 * | 4/2008 | Sako et al. .................... 385/123 |
| 7,437,040 B2 * | 10/2008 | Flammer ...................... 385/123 |
| 7,773,845 B2 * | 8/2010 | Imamura ...................... 385/124 |
| 7,787,731 B2 * | 8/2010 | Bookbinder et al. ......... 385/124 |
| 2005/0207714 A1 | 9/2005 | Koike et al. .................. 385/124 |
| 2006/0198589 A1 * | 9/2006 | Sako et al. .................... 385/123 |
| 2008/0019650 A1 * | 1/2008 | Hokansson et al. .......... 385/128 |
| 2008/0166094 A1 | 7/2008 | Bookbinder et al. ......... 385/124 |
| 2009/0052851 A1 | 2/2009 | Donlagic ...................... 385/124 |

FOREIGN PATENT DOCUMENTS

| JP | 52-146647 A | 12/1977 |
| JP | 60-007407 A | 1/1985 |
| JP | 2001-166172 A | 6/2001 |
| JP | 2005-089211 A | 4/2005 |

(Continued)

OTHER PUBLICATIONS

Olshansky, R., "Pulse broadening caused by deviations from the optimal index profile", Applied Optics, vol. 15, No. 3, pp. 782-788, Mar. 1976.

(Continued)

*Primary Examiner* — Uyen Chau N Le
*Assistant Examiner* — John M Bedtelyon
(74) *Attorney, Agent, or Firm* — Matthew J. Mason

(57) ABSTRACT

Multimode optical fiber is disclosed herein having a core surrounded by first and second annular cladding regions. The second annular cladding region has a maximum relative refractive index that is at least 0.05% higher than the minimum relative refractive index of the first annular cladding region.

10 Claims, 10 Drawing Sheets

(56) References Cited

FOREIGN PATENT DOCUMENTS

| WO | WO2006/010798 | 2/2006 | ............. G02B 6/036 |
|---|---|---|---|
| WO | WO 2006/012107 | 2/2006 | ............... G02B 6/00 |
| WO | WO 2006/026314 | 3/2006 | ............. G02B 6/028 |

OTHER PUBLICATIONS

Okamoto, K., et al., "Analysis of Wave Propagation in Optical Fibers Having Core with α-Power Refractive-Index Distribution and Uniform Cladding", IEEE Transactions on Microwave Theory and Techniques, vol. MTT-24, No. 7, pp. 416-421, Jul. 1976.

Geshiro, M., et al., "Truncated Parabolic-Index Fiber with Minimum Mode Dispersion", IEEE Transactions on Microwave Theory and Techniques, vol. MTT-26, No. 2, pp. 115-119, Feb. 1978.

Donlagic, Denis, "Opportunities to Enhance Multimode Fiber Links by Application of Overfilled Launch", IEEE Journal of Lightwave Technology, vol. 23, No. 11, pp. 3526-3540, Nov. 2005.

Fleming, J. W., "Material Dispersion in Lightguide Glasses", Electronic Letters, vol. 14, No. 11, pp. 326-328, May 1978.

Lenahan, T. A., "Calculation of modes in an optical fiber using the finite element method and EISPACK", The Bell System Technical Journal, vol. 62, No. 9, pp. 2663-2694, 1983.

* cited by examiner

MULTIMODE FIBER WITH AT LEAST DUAL CLADDING

CROSS-REFERENCE TO RELATED APPLICATIONS

This application claims the benefit of, and priority to U.S. Provisional Patent Application No. 61/088,490 filed on Aug. 13, 2008 entitled, "Multimode Fiber with At Least Dual Cladding", the content of which is relied upon and incorporated herein by reference in its entirety.

BACKGROUND OF THE INVENTION

1. Field of the Invention

The present invention relates generally to optical fiber, and particularly to graded index multimode fibers.

2. Technical Background

The bandwidth of multimode fibers (MMF) is limited mostly by inter-modal chromatic dispersion. To minimize the inter-modal chromatic dispersion, MMF are designed with graded index α-profiles. For optimum bandwidth, the parameter α is about 2. However, a practical MMF has a cladding that truncates the ideal alpha profile. For higher order modes near the cutoff frequency whose effective refractive index is close to that of the cladding, the time delay deviates from that of the infinite alpha profile. In the past, these modes were not of particular concern because they had high loss as a result of perturbations such as bending and cladding absorption.

However, as fiber glass and coating technologies have improved, losses due to micro-bending and cladding absorption have reduced significantly. As a result, some of the higher order modes can survive over the length of practical applications, which limits the multimode fiber bandwidth.

SUMMARY OF THE INVENTION

One aspect of the invention is a graded index multimode optical fiber. The optical fiber includes a core region extending radially outwardly from a centerline to a radius $R_1$ and having a positive relative refractive index percent profile $\Delta_1(r)$. The core region has a maximum relative refractive index percent, $\Delta_{1MAX}$. The optical fiber also includes a first annular cladding region surrounding and directly adjacent to the core region and extending to a radius $R_2$, having a width $W_2$ of $R_2-R_1$. The first annular cladding region has a relative refractive index percent profile $\Delta_2(r)$, with a minimum relative refractive index percent, $\Delta_{2MIN}$. In addition, the optical fiber includes a second annular cladding region surrounding the first annular cladding region and having a relative refractive index percent profile, $\Delta_3(r)$, with a maximum relative refractive index percent, $\Delta_{3MAX}$, wherein $\Delta_{3MAX}$ is ≥0.05%.

In another aspect, the present invention includes a graded index multimode optical fiber. The optical fiber includes a core region extending radially outwardly from a centerline to a radius $R_1$ and having a positive relative refractive index percent profile $\Delta_1(r)$. The core region has a maximum relative refractive index percent, $\Delta_{1MAX}$. The optical fiber also includes a first annular cladding region surrounding and directly adjacent to the core region and extending to a radius $R_2$, having a width $W_2$ of $R_2-R_1$, wherein $W_2$ is greater than 5 μm. The first annular cladding region has a relative refractive index percent profile $\Delta_2(r)$, with a minimum relative refractive index percent, $\Delta_{2MIN}$. In addition, the optical fiber includes a second annular cladding region surrounding the first annular cladding region and having a relative refractive index percent profile, $\Delta_3(r)$, with a maximum relative refractive index percent, $\Delta_{3MAX}$, wherein $(\Delta_{3MAX}-\Delta_{2MIN})\geq0.05\%$.

In the above-described aspects, the core region preferably has an alpha (α) between 1.8 and 2.5. In the above-described aspects, the optical fiber is preferably capable of guiding at least two mode groups at a wavelength of 850 nm, wherein the maximum differential delay between the fastest and slowest guided mode groups at a wavelength of 850 nm is less than 5 ns/km.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
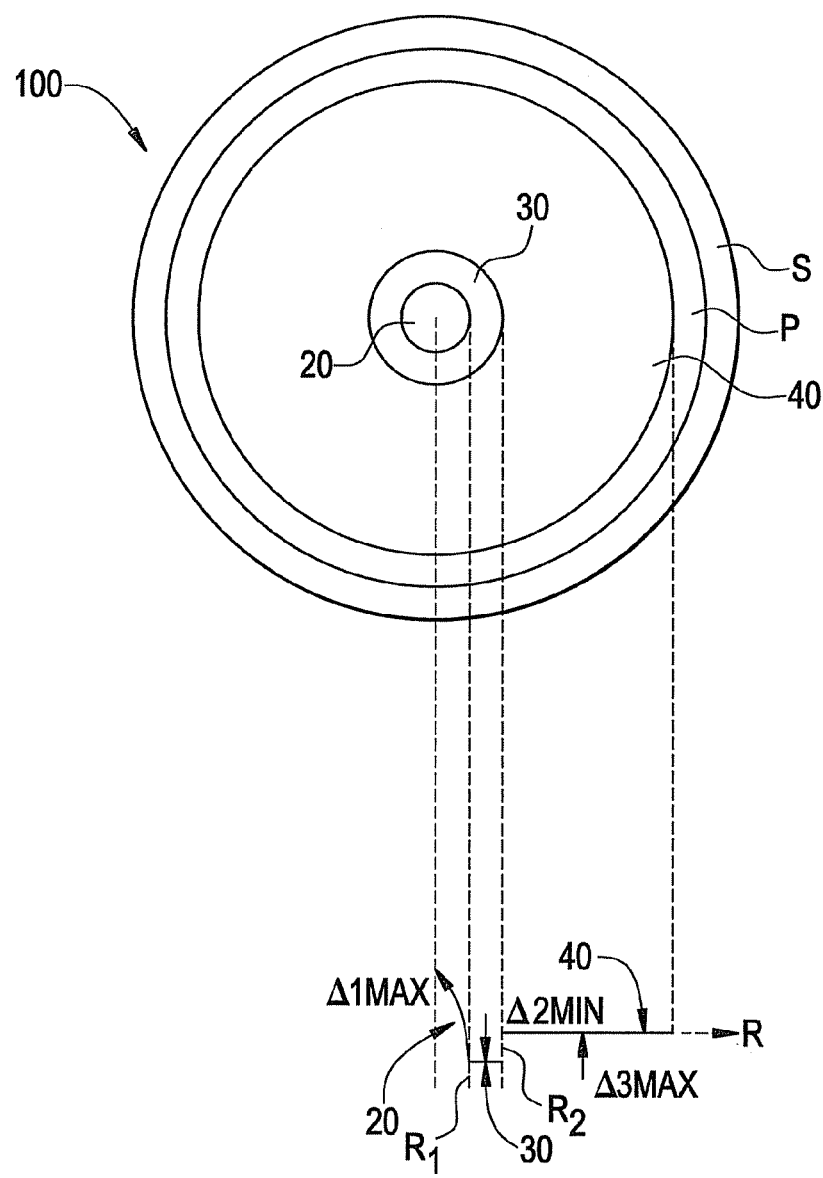
FIG. 1 schematically illustrates a cross-section of an optical waveguide fiber according to an embodiment as disclosed herein.

Reference will now be made in detail to the present preferred embodiments of the invention, examples of which are illustrated in the accompanying drawings. Whenever possible, the same reference numerals will be used throughout the drawings to refer to the same or like parts.

The "refractive index profile" is the relationship between refractive index or relative refractive index and waveguide fiber radius.

The "relative refractive index percent" or "delta" is defined as $\Delta\% = 100 \times (n_i^2 - n_s^2)/2n_i^2$, where $n_i$ is the maximum refractive index in region i, unless otherwise specified, and $n_s$ is the average refractive index of pure undoped silica glass. As used herein, the relative refractive index is represented by $\Delta$ and its values are given in units of "%", unless otherwise specified. The relative refractive index percent is measured at 800 nm unless otherwise specified. In cases where the refractive index of a region is less than the average refractive index of pure undoped silica glass, the relative index percent is negative and is referred to as having a depressed region or depressed index, and is calculated at the point at which the relative index is most negative unless otherwise specified. In cases where the refractive index of a region is greater than the average refractive index of pure undoped silica glass, the relative index percent is positive and the region can be said to be raised or to have a positive index. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants. Likewise, one or more other dopants which are not downdopants may be present in a region of an optical fiber having a negative relative refractive index.

Accordingly, the contribution of a relative refractive index percent or delta attributable to a particular dopant in a given region can be specified. For example, the contribution of $GeO_2$ to a relative refractive index percent can be specified as:

$$\Delta_{GeO2} = \frac{n_{GeO2}^2 - n_{SiO2}^2}{2n_{GeO2}^2}$$

Similarly, the contribution of fluorine to a relative refractive index percent can be specified as:

$$\Delta_F = \frac{n_F^2 - n_{SiO2}^2}{2n_F^2}$$

Relative refractive index percent or delta value is typically specified at a given wavelength. For the modeling conducted in this application, the wavelength is 800 nm. The material data such as the Sellmeier equation that determines the refractive index of the doped glass as well as dispersion follows that in the article, J. W. Fleming, "Material dispersion in Lightguide glasses", Electronics Letters Vol. 14, No. 11, 326-328 (1978).

The term "α-profile" refers to a relative refractive index profile, expressed in terms of $\Delta(r)$ which is in units of "%", where r is radius, which follows the equation, $$\Delta(r) = \Delta(r_o)(1 - [|r - r_o|/(r_1 - r_0)]^\alpha),$$

where $r_o$ is the point at which $\Delta(r)$ is maximum, $r_1$ is the point at which $\Delta(r)$ % is zero, and r is in the range $r_i \leq r \leq r_f$, where $\Delta$ is defined above, $r_i$ is the initial point of the α-profile, $r_f$ is the final point of the α-profile, and α is an exponent which is a real number.

The bend resistance of a waveguide fiber can be gauged by induced attenuation under prescribed test conditions. For example, macrobend performance can be determined according to FOTP-62 (IEC-60793-1-47) by wrapping 1 turn around either a 10 mm or 20 mm diameter mandrel (the "1×10 mm diameter macrobend loss" or the "1×20 mm diameter macrobend loss") and measuring the increase in attenuation due to the bending using an overfilled launch condition. For a fiber with low macrobend loss, the measurement is done by wrapping multiple turns on a mandrel to increase the accuracy. The macrobend loss is normalized to 1 turn/m by dividing the total loss by the number of wraps around the mandrel.

Bandwidth can be measured by using the TIA/EIA Standard described in TIA/EIA-455-204 "Measurement of Bandwidth on Multimode Fiber", or "FOTP-204", or by using the TIA/EIA Standard described in TIA/EIA-455-220 "Differential Mode Delay Measurement of Multimode Fiber in the Time Domain", or "FOTP-220", as appropriate.

In the multimode optical fiber disclosed herein, the core is a graded-index core, and preferably, the refractive index profile of the core has a parabolic (or substantially parabolic) shape. For example, in some embodiments, the refractive index profile of the core has an α-shape with a value of about 2, preferably between 1.8 and 2.3, as measured at 850 nm. In some embodiments, the refractive index of the core may have a centerline dip, wherein the maximum refractive index of the core, and the maximum refractive index of the entire optical fiber, is located a small distance away from the centerline, but in other embodiments the refractive index of the core has no centerline dip, and the maximum refractive index of the core, and the maximum refractive index of the entire optical fiber, is located at the centerline. As used herein, "parabolic" therefore includes substantially parabolically shaped refractive index profiles which may vary slightly from a value of 2.00 at one or more points in the core, as well as profiles with minor variations and/or a centerline dip.

As depicted in FIG. 1, optical waveguide fibers 100 disclosed herein preferably comprise a core region 20 extending radially outwardly from the centerline to a core region outer radius, $R_1$, and having a relative refractive index profile, $\Delta_1(r)$, with a maximum relative refractive index percent, $\Delta_{1MAX}$; a first annular cladding region 30 surrounding and directly adjacent to the core region 20 and extending to a radius $R_2$ and having a relative refractive index percent profile $\Delta_2(r)$, with a minimum relative refractive index percent, $\Delta_{2MIN}$; and a second annular cladding region 40 surrounding the first annular cladding region 30 and having a relative refractive index profile, $\Delta_3(r)$, with a maximum relative refractive index percent $\Delta_{3MAX}$; wherein $(\Delta_{3MAX}-\Delta_{2MIN})\geq 0.05\%$. Second annular cladding region 40 is surrounded by a primary coating P and a secondary coating S. $R_1$ is defined to occur at the point where $\Delta_1(r)$ first drops below $\Delta_{3MAX}-0.05\%$ going radially outward from $\Delta_{1MAX}$. $R_2$ is defined to occur at the point where $\Delta_2(r)$ first rises above $\Delta_{3MAX}-0.05\%$ going radially outward from $\Delta_{2MIN}$. First annular cladding region 30 begins at $R_1$ and ends at $R_2$. The width $W_2$ of first annular cladding region 30 is $R_2-R_1$. Preferably, $W_2$ is greater than 5 μm, and $\Delta_{1MAX}$ is greater than 0.50%. Preferably, $(\Delta_{3MAX}-\Delta_{2MIN})\geq 0.1\%$, more preferably, $(\Delta_{3MAX}-\Delta_{2MIN})\geq 0.15\%$, and even more preferably $(\Delta_{3MAX}-\Delta_{2MIN})\geq 0.2\%$.

Figure 6:
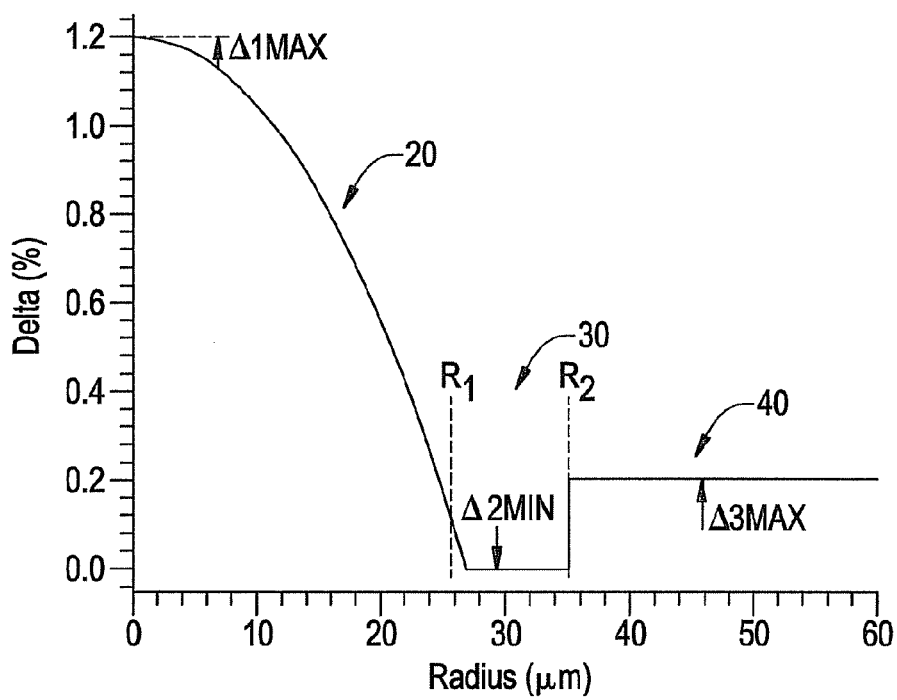
FIG. 6 schematically illustrates a refractive index profile corresponding to an optical waveguide fiber as disclosed herein.
Figure 8:
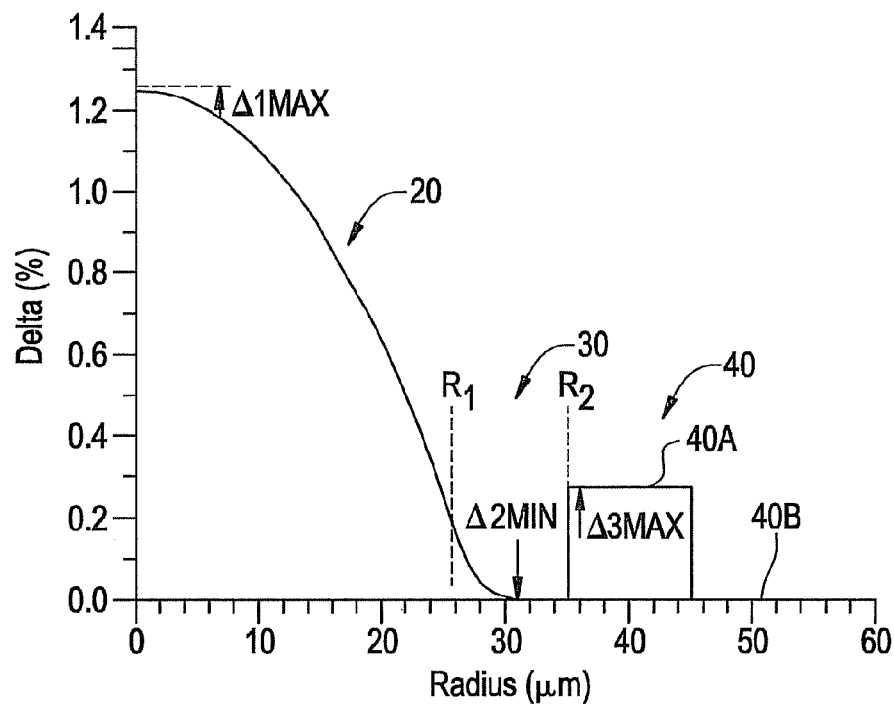
FIG. 8 schematically illustrates a refractive index profile corresponding to an optical waveguide fiber as disclosed herein.
Figure 10:
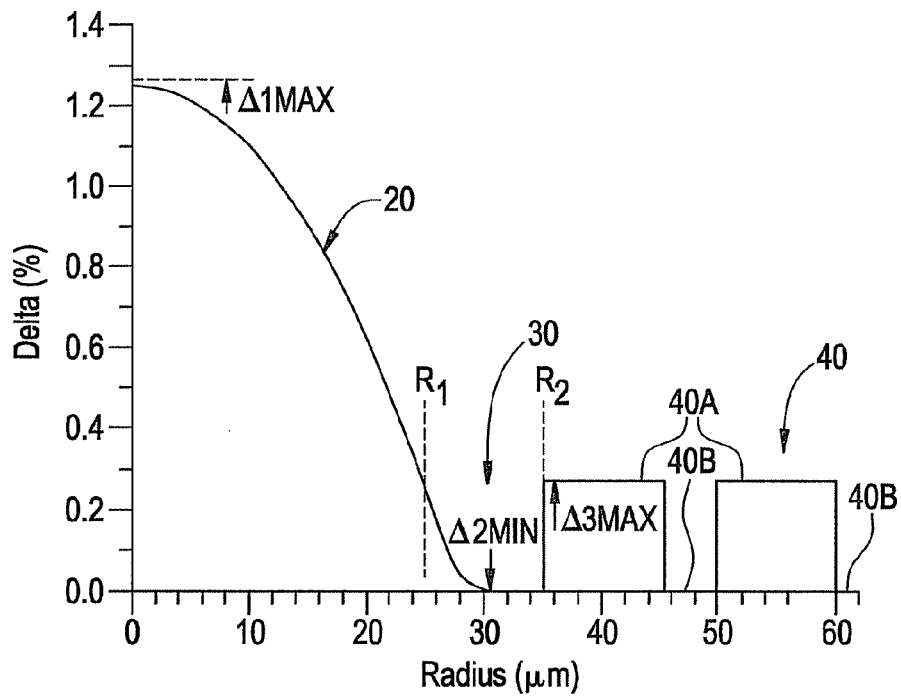
FIG. 10 schematically illustrates a refractive index profile corresponding to an optical waveguide fiber as disclosed herein.

FIGS. 6, 8, and 10 depict exemplary refractive index profiles within a first set of preferred embodiments in which $\Delta_{3MAX}$ is $\geq 0.05\%$, and is more preferably $\geq 0.1\%$, and is even more preferably $\geq 0.15\%$, such as $0.15\%\leq\Delta_{3MAX}\leq 0.5\%$. In FIG. 6, $\Delta_3(r)$ is depicted as being relatively constant in second annular cladding region 40. By "relatively constant" it is meant that $\Delta_3(r)$ has a relative refractive index percent of at least about $0.9\times\Delta_{3MAX}$ from about $R_2$ to the outermost edge of second annular cladding region 40. In FIG. 8, $\Delta_3(r)$ is depicted as alternating between a region of higher 40A and lower 40B relative refractive index. In FIG. 10, $\Delta_3(r)$ is depicted as alternating between two regions of higher 40A and lower 40B relative refractive index. In at least one of the regions of higher relative refractive index, $\Delta_3(r)$ has a maximum relative refractive index percent of $\Delta_{3MAX}$. In at least one of the regions of lower relative refractive index, $\Delta_3(r)$ preferably has a minimum relative refractive index percent $\Delta_{3MIN}$ of about 0. While FIG. 10 shows an embodiment having two regions of higher 40A and two regions of lower 40B relative refractive index, preferred embodiments include those having greater or fewer numbers of such regions, such as one region of higher relative refractive index surrounded by one region of lower relative refractive index (FIG. 8) or three or more regions of higher relative refractive index surrounded by three more regions of lower relative refractive index. In preferred embodiments, the regions of higher and lower relative refractive index each independently have radial widths of at least 5 μm, such as at least 7.5 μm, and even further such as at least 10 μm.

In the embodiments depicted in FIGS. 6, 8 and 10, $\Delta_{2MIN}$ is preferably at least 0% and can be about 0%, such as between 0% and 0.01%. In preferred embodiments, first annular cladding region 30 contains no index-decreasing dopants, such as fluorine. In preferred embodiments, the fiber contains no index-decreasing dopants, such as fluorine. In preferred embodiments, $W_2$ is greater than 5 μm, such as greater than or equal to 7.5 μm, and even further such as greater than or equal to 10 μm. In a particularly preferred embodiment, 7 μm≤$W_2$≤10 μm. In preferred embodiments, core region 20 and second annular cladding region 40 are doped with at least one dopant selected from the updopant group consisting of germanium, aluminum, titanium, and phosphorous or from the down dopant group consisting of fluorine and boron. Particularly preferred dopants are germanium, aluminum, and fluorine.

FIGS. 6, 8, and 10 depict exemplary embodiments in which $\Delta_{1MAX}$ is greater than 1.00% and $R_1$ is greater than 20 μm. For example, in one set of preferred embodiments, 1.00%≤$\Delta_{1MAX}$≤2.00% and 20 μm≤$R_1$≤30 μm, such as 1.20%≤$\Delta_{1MAX}$≤2.00% and 25 μm≤$R_1$≤30 μm. In other preferred embodiments in which $\Delta_{3MAX}$ is ≥0.05%, $\Delta_{1MAX}$ is less than 1.00% and $R_1$ is less than 20 μm (not shown in FIGS. 6, 8 and 10). For example, in one set of preferred embodiments 0.50%≤$\Delta_{1MAX}$≤1.00% and 10 μm≤$R_1$≤20 μm, such as 0.50%≤$\Delta_{1MAX}$≤0.80% and 10 μm≤$R_1$≤15 μm. While it is to be understood that in each of these embodiments, the refractive index profile can deviate from an ideal alpha profile, in each of these embodiments, core region 20 preferably has an alpha (α) between 1.8 and 2.5, even more preferably between 1.9 and 2.2, and yet even more preferably between 2.0 and 2.1. In a particularly preferred embodiment, core region 20 has an alpha (α) of about 2.06.

For example, the first set of preferred embodiments includes those in which 1.00%≤$\Delta_{1MAX}$≤2.00%, 0%≤$\Delta_{2MIN}$≤0.02%, 0.1%≤$\Delta_{3MAX}$≤0.5%, 20 μm≤$R_1$≤30 μm, 5 μm≤$W_2$≤10 μm, and core region 20 has an alpha (α) between 1.8 and 2.5. First set of preferred embodiments also include those in which 0.50%≤$\Delta_{1MAX}$≤1.00%, 0%≤$\Delta_{2MIN}$≤0.02%, 0.1%≤$\Delta_{3MAX}$≤0.5%, 10 μm≤$R_1$≤20 μm, 5 μm≤$W_2$≤10 μm, and core region 20 has an alpha (α) between 1.8 and 2.5. In addition, first set of preferred embodiments includes those in which 1.00%≤$\Delta_{1MAX}$≤2.00%, 0%≤$\Delta_{2MIN}$≤0.02%, 0.15%≤$\Delta_{3MAX}$≤0.25%, 20 μm≤$R_1$≤30 μm, 7 μm≤$W_2$≤10 μm, and core region 20 has an alpha (α) between 1.9 and 2.2. First set of preferred embodiments also includes those in which 0.50%≤$\Delta_{1MAX}$≤1.00%, 0%≤$\Delta_{2MIN}$≤0.02%, 0.15%≤$\Delta_{3MAX}$≤0.25%, 10 μm≤$R_1$≤20 μm, 7 μm≤$W_2$≤10 μm, and core region 20 has an alpha (α) between 1.9 and 2.2.

Figure 12:
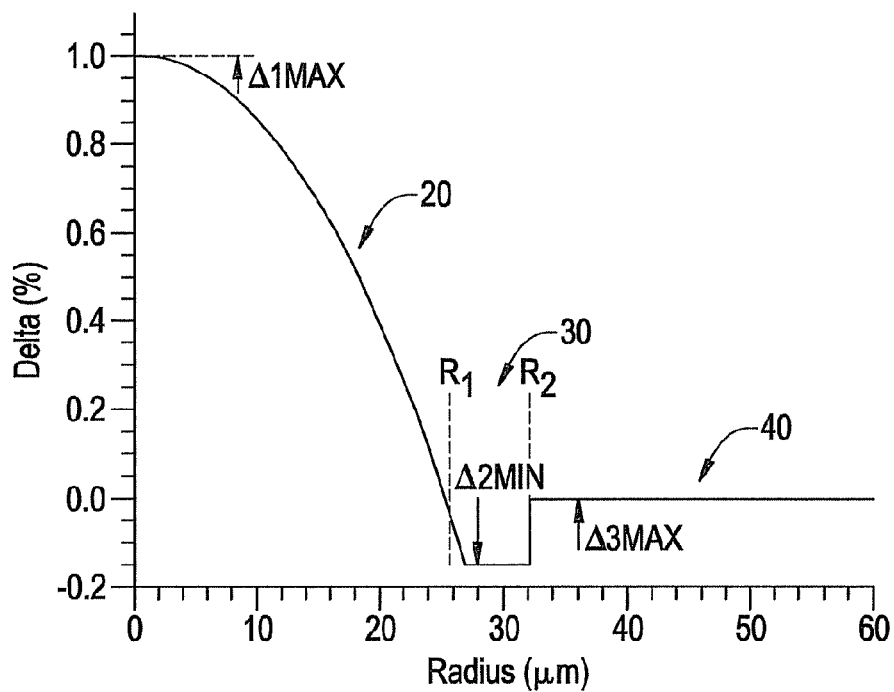
FIG. 12 schematically illustrates a refractive index profile corresponding to an optical waveguide fiber as disclosed herein.
Figure 14:
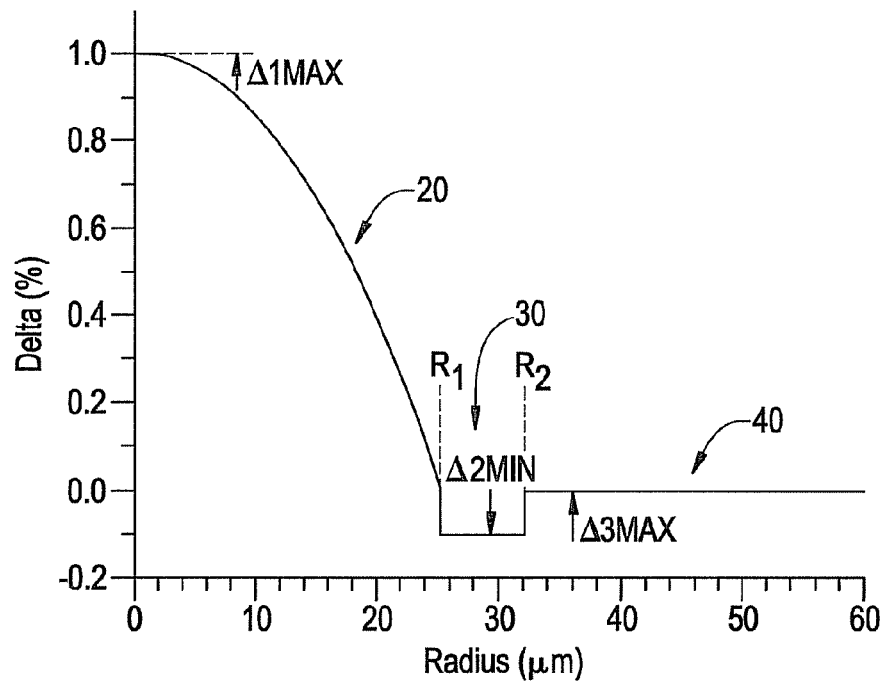
FIG. 14 schematically illustrates a refractive index profile corresponding to an optical waveguide fiber as disclosed herein.
Figure 16:
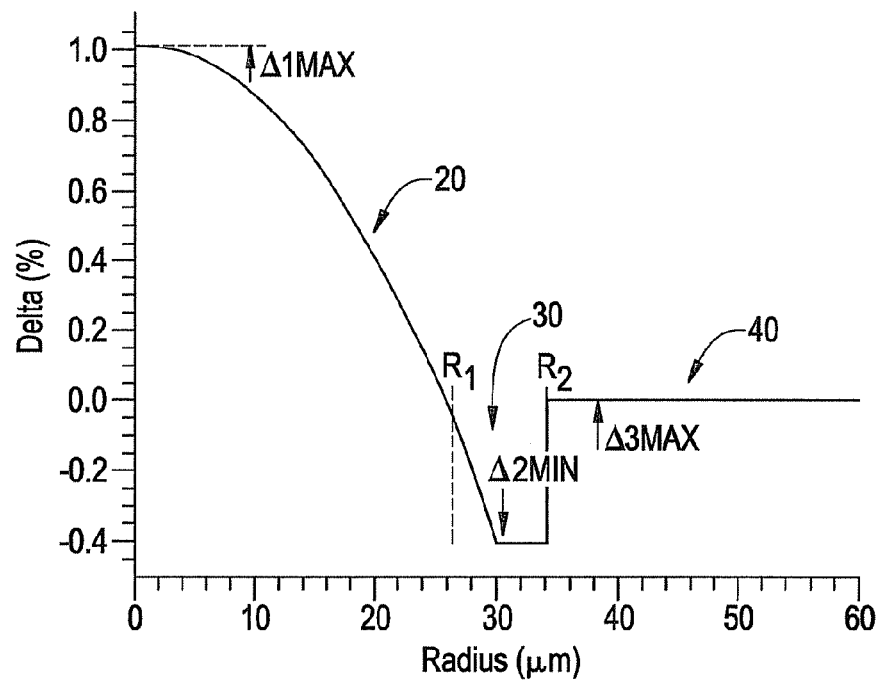
FIG. 16 schematically illustrates a refractive index profile corresponding to an optical waveguide fiber as disclosed herein.

FIGS. 12, 14, and 16 depict exemplary refractive index profiles within a second set of preferred embodiments in which $(\Delta_{3MAX}-\Delta_{2MIN})\geq 0.05\%$, and is more preferably ≥0.1%, and is even more preferably ≥0.15%, such as $0.15\%\leq(\Delta_{3MAX}-\Delta_{2MIN})\leq 0.5\%$, wherein $\Delta_{2MIN}$ is less than 0%, such as $-0.05\%\geq\Delta_{2MIN}\geq -0.5\%$, and $W_2$ is greater than 5 μm. In such embodiments, $\Delta_{3MAX}$ is preferably about 0%, such as between 0% and 0.02%. In preferred embodiments, $W_2$ is greater than or equal to 7.5 μm, such as greater than or equal to 10 μm. In a particularly preferred embodiment, 7 μm≤$W_2$≤10 μm. In preferred embodiments, core region 20 is doped with at least one dopant selected from the updopant group consisting of germanium, aluminum, titanium, and phosphorous or the downdopant group consisting of fluorine and boron. Particularly preferred updopants are germanium, and aluminum, and an up-doped core region can also be additionally doped with fluorine. In preferred embodiments, first annular cladding region 30 is doped with at least one downdopant, such as fluorine. In additional preferred embodiments, core region 20 and cladding region 30 are downdoped with the same downdopant, such as fluorine, while core region 20 is additionally doped with at least one updopant, such as germanium.

FIGS. 12, 14, and 16 depict exemplary embodiments in which $\Delta_{1MAX}$ is about 1.00% and $R_1$ is greater than 20 μm. For example, in one set of preferred embodiments, 1.00%≤$\Delta_{1MAX}$≤2.00% and 20 μm≤$R_1$≤30 μm, such as 1.20%≤$\Delta_{1MAX}$≤2.00% and 25 μm≤$R_1$≤30 μm. In other preferred embodiments in which $(\Delta_{3MAX}-\Delta_{2MIN})\geq 0.05\%$, $\Delta_{1MAX}$ is less than 1.00% and $R_1$ is less than 20 μm (not shown in FIGS. 12, 14, and 16). For example, in one set of preferred embodiments 0.50%≤$\Delta_{1MAX}$≤1.00% and 10 μm≤$R_1$≤20 μm, such as 0.50%≤$\Delta_{1MAX}$≤0.80% and 10 μm≤$R_1$≤15 μm. While it is to be understood that in each of these embodiments, the refractive index profile can deviate from an ideal alpha profile, in each of these embodiments, core region 20 preferably has an alpha (α) between 1.8 and 2.5, even more preferably between 1.9 and 2.2, and yet even more preferably between 2.0 and 2.1. In a particularly preferred embodiment, core region 20 has an alpha (α) of about 2.06.

For example, the second set of preferred embodiments includes those in which $1.00\% \leq \Delta_{1MAX} \leq 2.00\%$, $-0.5\% \leq \Delta_{2MIN} \leq -0.1\%$, $0\% \leq \Delta_{3MAX} \leq 0.02\%$, 20 µm $\leq R_1 \leq$ 30 µm, 5 µm $\leq W_2 \leq$ 10 µm, and core region 20 has an alpha (α) between 1.8 and 2.5. Second set of preferred embodiments also includes those in which $0.50\% \leq \Delta_{1MAX} \leq 1.00\%$, $-0.5\% \leq \Delta_{2MIN} \leq -0.1\%$, $0\% \leq \Delta_{3MAX} \leq 0.02\%$, 10 µm $\leq R_1 \leq$ 20 µm, 5 µm $\leq W_2 \leq$ 10 µm, and core region 20 has an alpha (α) between 1.8 and 2.5. In addition, second set of preferred embodiments includes those in which $1.00\% \leq \Delta_{1MAX} \leq 2.00\%$, $-0.2\% \leq \Delta_{2MIN} \leq -0.1\%$, $0\% \leq \Delta_{3MAX} \leq 0.02\%$, 20 µm $\leq R_1 \leq$ 30 µm, 7 µm $\leq W_2 \leq$ 10 µm, and core region 20 has an alpha (α) between 1.9 and 2.2. Second set of preferred embodiments also include those in which $0.50\% \leq \Delta_{1MAX} \leq 1.00\%$, $-0.2\% \leq \Delta_{2MIN} \leq -0.1\%$, $0\% \leq \Delta_{3MAX} \leq 0.02\%$, 10 µm $\leq R_1 \leq$ 20 µm, 7 µm $\leq W_2 \leq$ 10 µm, and core region 20 has an alpha (α) between 1.9 and 2.2.

In preferred embodiments, multimode optical fiber can be provided that guide at least 2, and preferably at least 5, such as at least 10, and further such as at least 15, and still even further at least 20 mode groups at a wavelength of 850 nm, wherein the maximum differential delay between the fastest and slowest guided mode groups at a wavelength of 850 nm is preferably less than 5 ns/km, more preferably less than 1 ns/km, even more preferably less than 0.5 ns/km, and yet even more preferably less than 0.2 ns/km, and still yet even more preferably less than 0.1 ns/km.

Preferably, the fibers disclosed herein are made by a vapor deposition process. Even more preferably, the fibers disclosed herein are made by an outside vapor deposition (OVD) process. Thus, for example, known OVD laydown, consolidation, and draw techniques may be advantageously used to produce the optical waveguide fiber disclosed herein. Other processes, such as modified chemical vapor deposition (MCVD) or vapor axial deposition (VAD) or plasma chemical vapor deposition (PCVD) may be used. Thus, the refractive indices and the cross sectional profile of the optical waveguide fibers disclosed herein can be accomplished using manufacturing techniques known to those skilled in the art including, but in no way limited to, OVD, VAD and MCVD processes.

Preferably, the optical fiber disclosed herein has a silica-based core and cladding. In preferred embodiments, the cladding has an outer diameter, 2×Rmax, of about 125 µm. Preferably, the outer diameter of the cladding has a constant diameter along the length of the optical fiber. In preferred embodiments, the refractive index of the optical fiber has radial symmetry. Preferably, the outer diameter of the core has a constant diameter along the length of the optical fiber. Preferably, one or more coatings surround and are in contact with the cladding. The coating is preferably a polymer coating such as acrylate. Preferably the coating has a constant diameter, radially and along the length of the fiber.

EXAMPLES

The invention will be further clarified by the following examples in which the performance of multimode fiber was evaluated through numerical modeling. In these examples, the scheme developed in the following article, T. A. Lenahan, "Calculation of modes in an optical fiber using the finite element method and EISPACK", The Bell System Technical Journal Vol. 62, (No. 9) 2663-2694 (1983), was followed. In the examples, the fiber performance was dictated by the scalar wave equation:

$$\left(\frac{1}{r}\frac{d}{dr}r\frac{d}{dr} - \frac{m^2}{r^2} + k^2\right)f(r) = \beta^2 f(r)$$

where r is the radius, f(r) is the eigenfield in the radial direction, $k = 2\pi n(r)/\lambda$, n(r) is the refractive index profile, λ is the wavelength, m is the angular parameter indexing the modes, and β is propagation constant. For each m, there can be two eigen-modes, µ, such that the mode number, Q, is defined as:

$Q = 2\mu + m + 1$

Comparative Example 1

Figure 2:
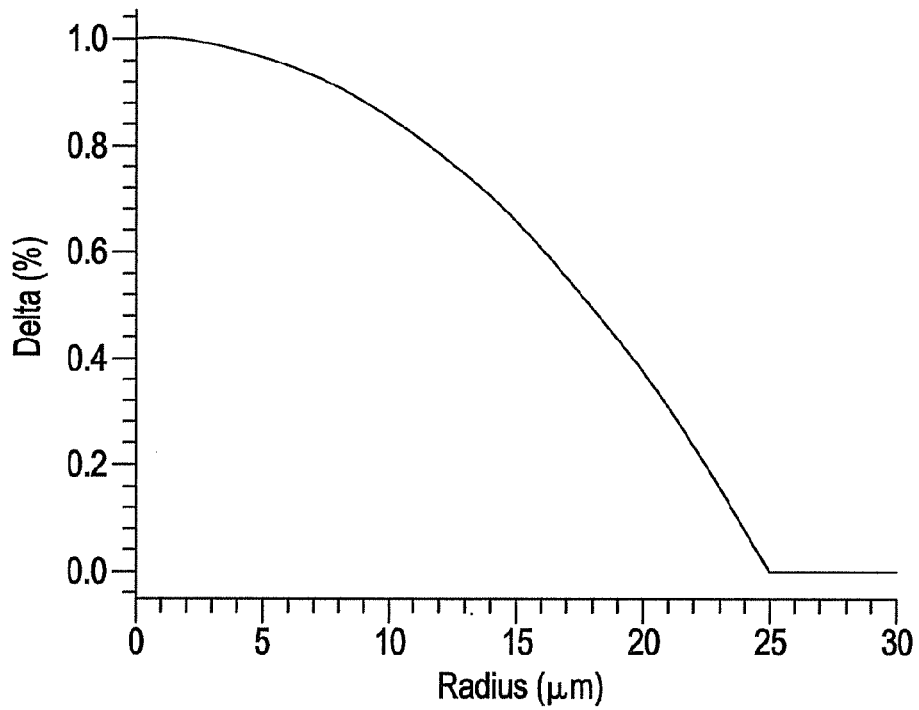
FIG. 2 schematically illustrates a refractive index profile corresponding to an optical waveguide fiber with a constant index cladding.
Figure 3:
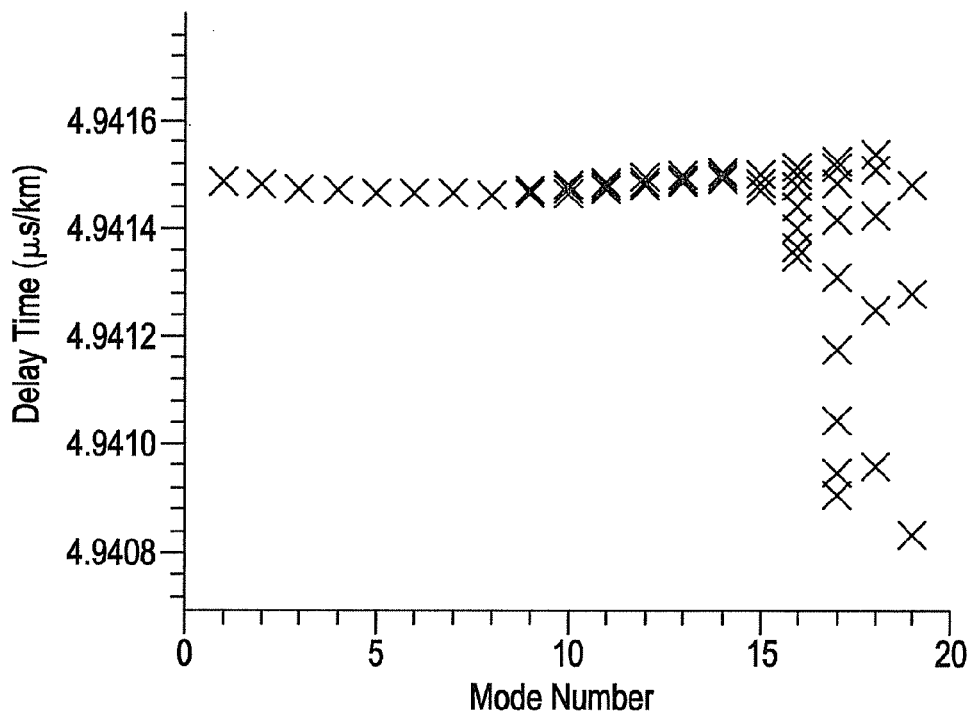
FIG. 3 shows differential mode delay time versus mode number for the optical fiber profile of FIG. 2.

FIG. 2 schematically depicts a refractive index profile corresponding to an optical waveguide fiber with a constant index cladding. The profile of FIG. 2 shows a core with a peak delta value of 1.0%, a radius of 25 µm, and an alpha value of 2.06. The differential mode delay time versus mode number for the optical fiber profile of FIG. 2 is illustrated in the FIG. 3. As can be seen in FIG. 3, differential mode delay time is less than 0.1 ns/km for a mode number up to 14. However, at a mode number above 14, the delay time spreads, such that the highest order modes (e.g., those with mode numbers from 16 to 19) show a differential mode delay time approaching about 1 ns/km, which reduces the bandwidth performance of the fiber.

Comparative Example 2

Figure 4:
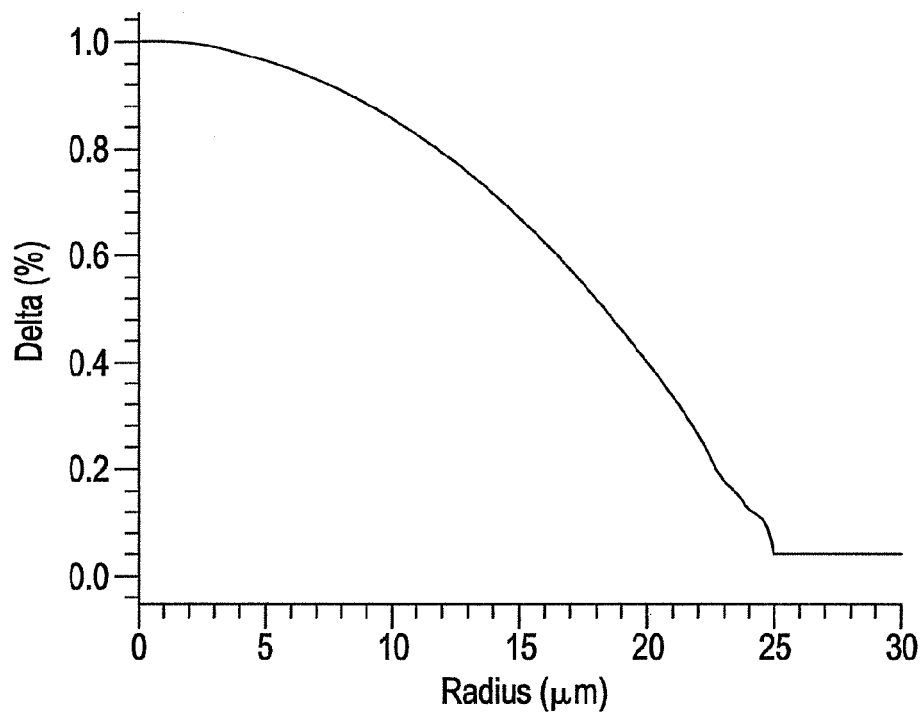
FIG. 4 schematically illustrates a refractive index profile corresponding to an optical waveguide fiber with a distortion from an ideal alpha profile and a constant index cladding.
Figure 5:
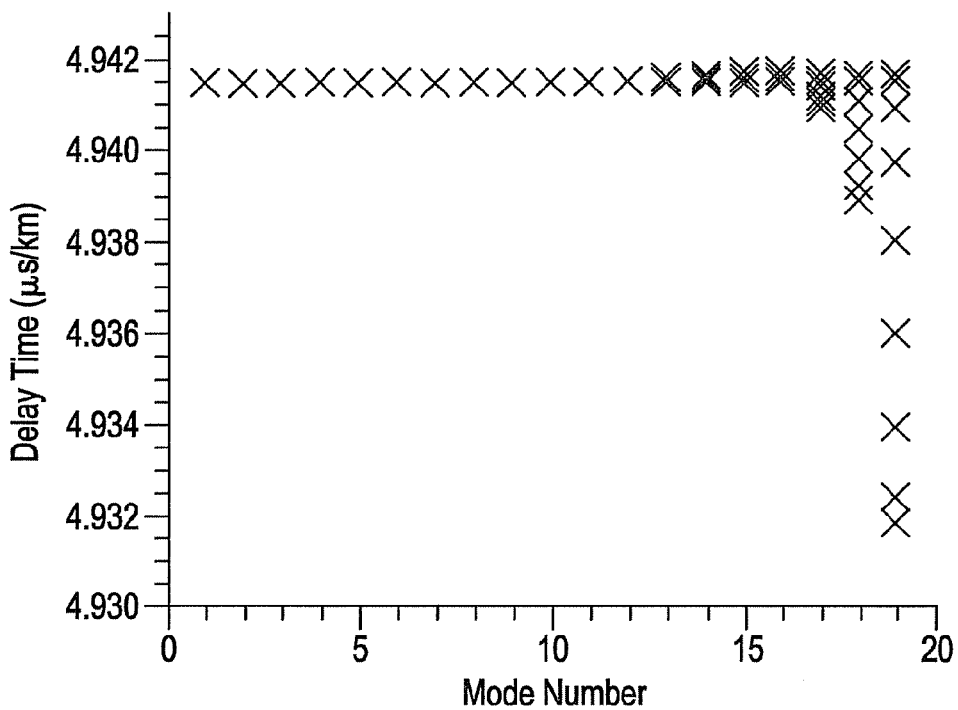
FIG. 5 shows differential mode delay time versus mode number for the optical fiber profile of FIG. 4.

FIG. 4 schematically depicts a refractive index profile corresponding to an optical waveguide fiber with a constant index cladding that is identical to the refractive index profile depicted in FIG. 2 except for a distortion from the ideal alpha profile near the edge of the fiber core in order to mimic a profile often observed in actual fiber. The differential mode delay time versus mode number for the optical fiber profile of FIG. 4 is illustrated in FIG. 5. As the result of the distortion, as shown in FIG. 5, the delay time for the highest order modes (e.g., those with mode numbers from 16 to 19) spreads to a range that is essentially an order of magnitude wider than that in FIG. 3, with a maximum difference of about 10 ns/km. Such spread contributes to reduced fiber bandwidth performance.

Example 1

Figure 7:
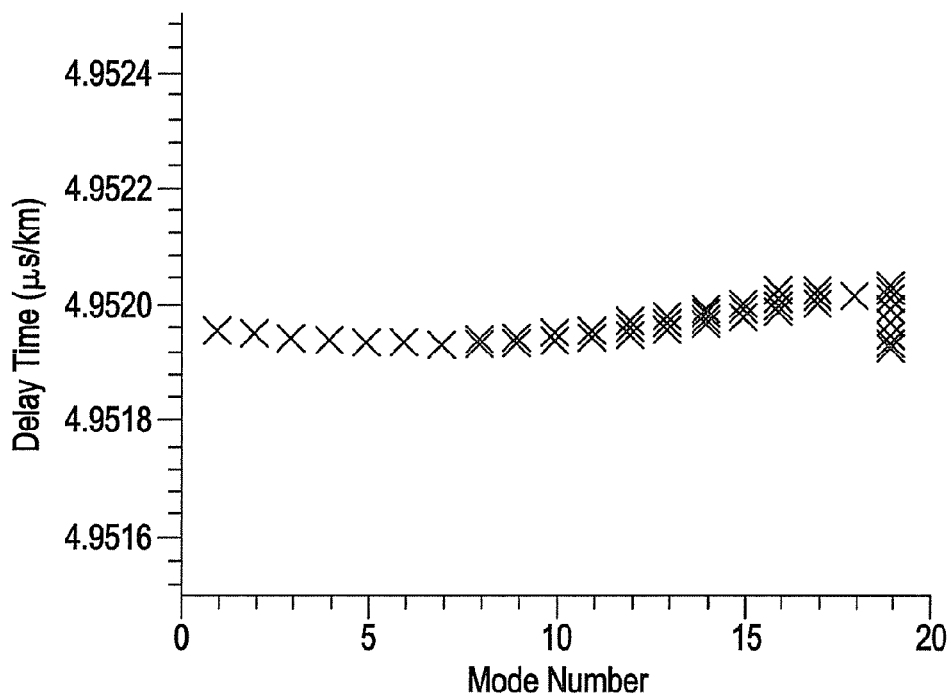
FIG. 7 shows differential mode delay time versus mode number for the optical fiber profile of FIG. 6.

FIG. 6 schematically illustrates a refractive index profile corresponding to an embodiment of the invention wherein the cladding is up-doped with $GeO_2$ from a radius of 35 µm to the outermost edge of the cladding, wherein $\Delta_{3MAX}$ is 0.2%, $\Delta_{2MIN}$ is 0%, and the fiber contains no downdopants, such as fluorine. The differential mode delay time versus mode number for the optical fiber profile of FIG. 6 is illustrated in FIG. 7. The highest order modes (e.g., those with mode numbers from 16 to 19) each show a differential mode delay time that is limited to within about 0.12 ns/km.

Example 2

Figure 9:
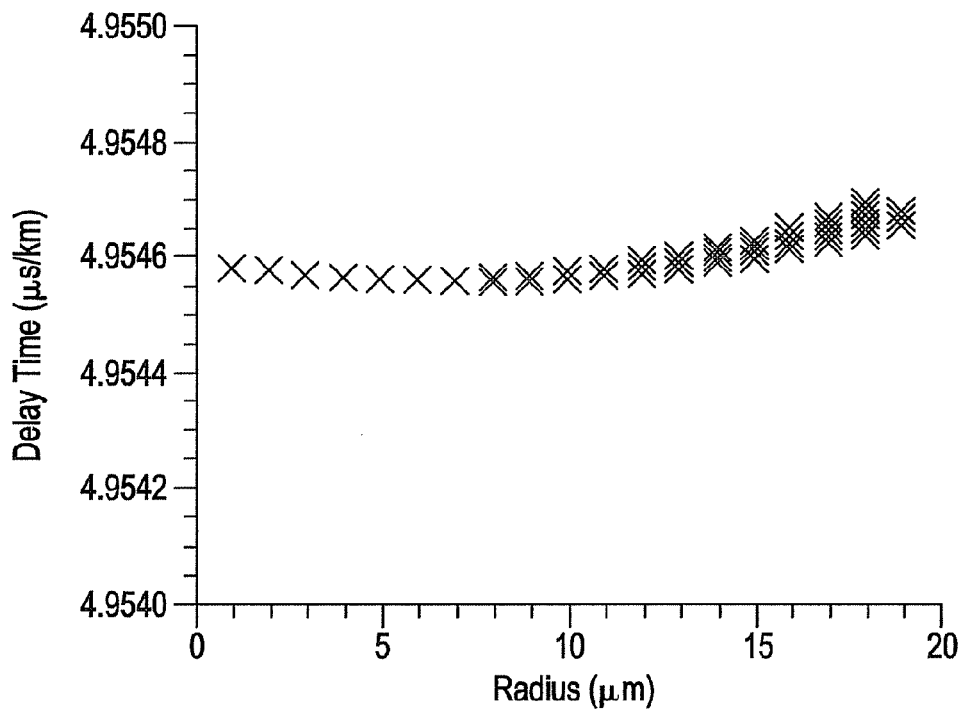
FIG. 9 shows differential mode delay time versus mode number for the optical fiber profile of FIG. 8.

FIG. 8 schematically illustrates a refractive index profile corresponding to an embodiment of the invention wherein the cladding is up-doped with $GeO_2$ from a radius of 35 µm to a radius of 45 μm (i.e., a single up-doped ring), wherein $\Delta_{3MAX}$ is 0.25%, $\Delta_{2MIN}$ is 0%, and the fiber contains no downdopants, such as fluorine. This fiber index profile includes a diffused tail in the fiber core, which is a distortion from an ideal alpha profile. The differential mode delay time versus mode number for the optical fiber profile of FIG. 8 is illustrated in FIG. 9. The highest order modes (e.g., those with mode numbers from 16 to 19) each show a differential mode delay time that is less than 0.10 ns/km.

Example 3

Figure 11:
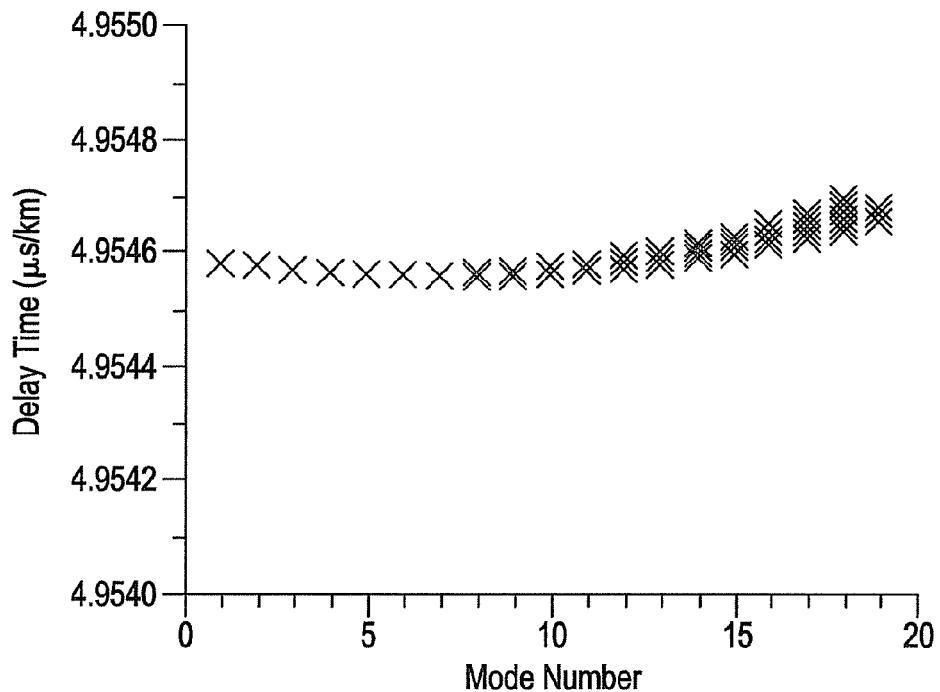
FIG. 11 shows differential mode delay time versus mode number for the optical fiber profile of FIG. 10.

FIG. 10 schematically illustrates a refractive index profile corresponding to an embodiment of the invention wherein the cladding is up-doped with $GeO_2$ from a radius of 35 μm to a radius of 45 μm and again from a radius of 50 μm to a radius of 60 μm (i.e., dual up-doped rings), wherein $\Delta_{3MAX}$ is 0.25%, $\Delta_{2MIN}$ is 0%, and the fiber contains no downdopants, such as fluorine. This fiber index profile includes a diffused tail in the fiber core, which is a distortion from an ideal alpha profile. The differential mode delay time versus mode number for the optical fiber profile of FIG. 10 is illustrated in FIG. 11. The highest order modes (e.g., those with mode numbers from 16 to 19) each show a differential mode delay time that is less than 0.10 ns/km.

Example 4

Figure 13:
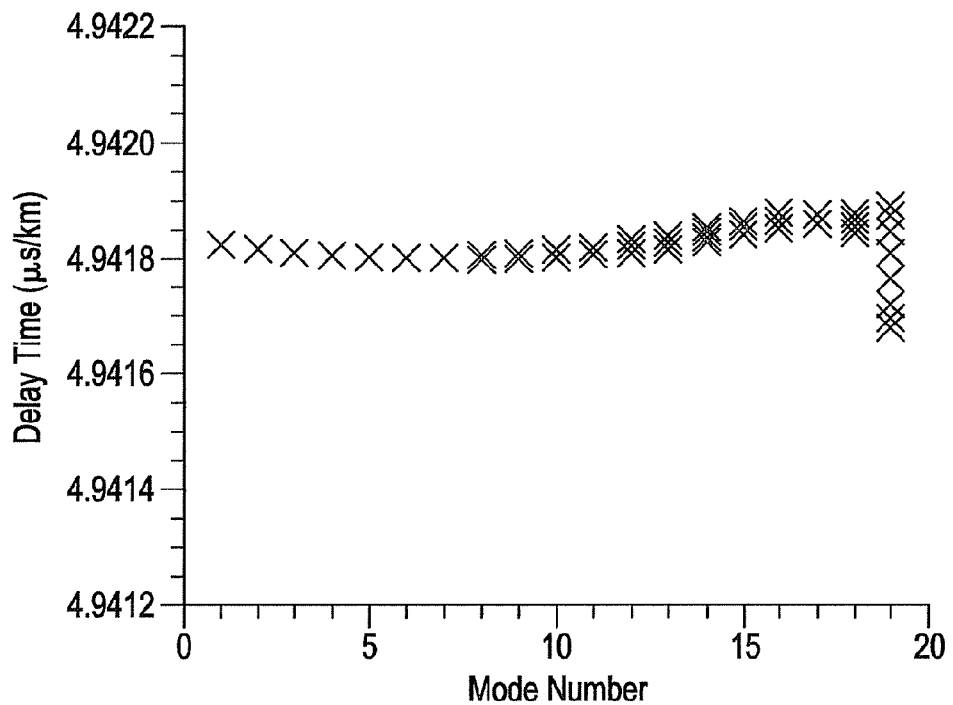
FIG. 13 shows differential mode delay time versus mode number for the optical fiber profile of FIG. 12.

FIG. 12 schematically illustrates a refractive index profile corresponding to an embodiment of the invention wherein both the core and first annular cladding region are down-doped with fluorine from a radius of 0 μm to a radius of 32 μm, such that the fluorine doping contributes to a delta of −0.15% from a radius of 0 μm to a radius of 32 μm. The core is also up-doped with $GeO_2$ so as to provide a peak delta contributed by $GeO_2$ of 1.15% (such that the net contribution of the fluorine and $GeO_2$ codoping results in a peak core delta of 1.00%) and a core alpha of 2.054. From a radius of 32 microns to the outer edge of the fiber, the cladding is undoped (pure silica). The differential mode delay time versus mode number for the optical fiber profile of FIG. 12 is illustrated in FIG. 13. The highest order modes (e.g., those with mode numbers from 16 to 19) each show a differential mode delay time that is less than 0.25 ns/km.

Example 5

Figure 15:
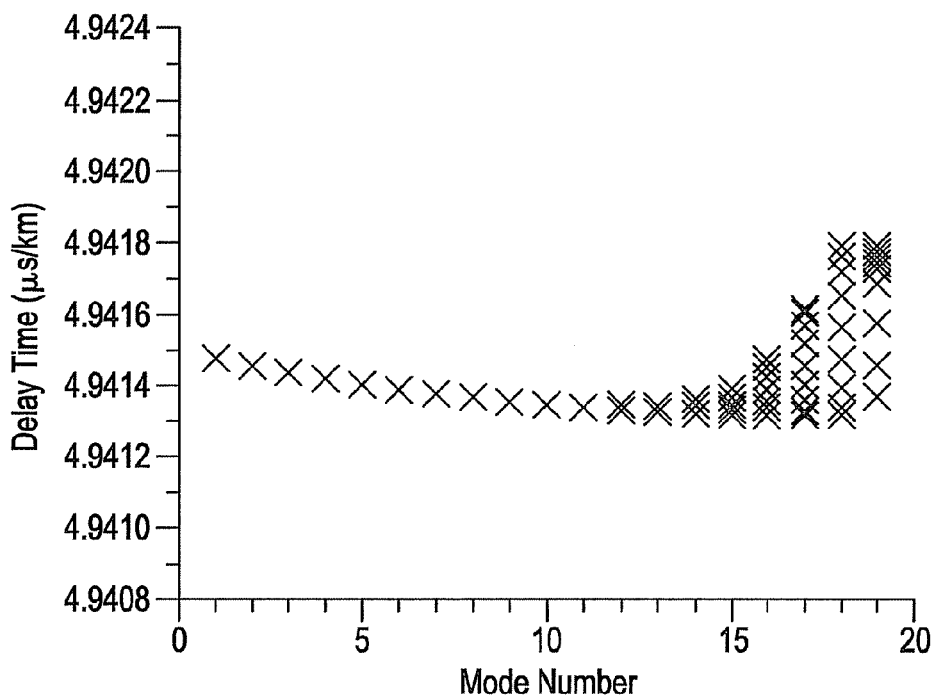
FIG. 15 shows differential mode delay time versus mode number for the optical fiber profile of FIG. 14.

FIG. 14 schematically illustrates a refractive index profile corresponding to an embodiment of the invention wherein the core is up-doped with $GeO_2$ (but no fluorine) so as to provide a peak delta of 1.0%, a core alpha of 2.04, and a core radius of 25 μm. First annular cladding region is down-doped with fluorine from a radius of 25 μm to a radius of 32 μm to provide for a minimum delta in first annular cladding region of −0.1%. From a radius of 32 microns to the outer edge of the fiber, the cladding is undoped (pure silica). The differential mode delay time versus mode number for the optical fiber profile of FIG. 14 is illustrated in FIG. 15. The highest order modes (e.g., those with mode numbers from 16 to 19) each show a differential mode delay time that is less than 0.5 ns/km.

Example 6

Figure 17:
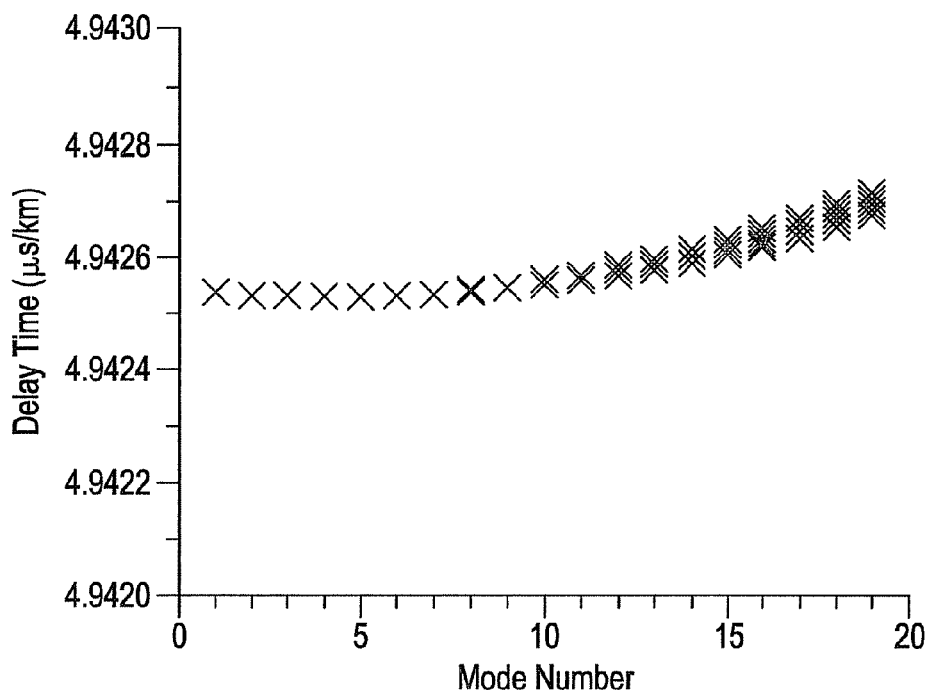
FIG. 17 shows differential mode delay time versus mode number for the optical fiber profile of FIG. 16.

FIG. 16 schematically illustrates a refractive index profile corresponding to an embodiment of the invention wherein both the core and first annular cladding region are down-doped with fluorine from a radius of 0 μm to a radius of 34 μm, such that the fluorine doping contributes to a delta of −0.4% from a radius of 0 μm to a radius of 34 μm. The core is also up-doped with $GeO_2$ so as to provide a peak delta contributed by $GeO_2$ of 1.4% (such that the net contribution of the fluorine and $GeO_2$ codoping results in a peak core delta of 1.0%) and a core alpha of 2.053. From a radius of 34 microns to the outer edge of the fiber, the cladding is undoped (pure silica). The differential mode delay time versus mode number for the optical fiber profile of FIG. 16 is illustrated in FIG. 17. The highest order modes (e.g., those with mode numbers from 16 to 19) each show a differential mode delay time that is less than 0.2 ns/km.

In addition, the refractive index profile illustrated in FIG. 16 can exhibit improved bend loss, such as less than about 0.02 dB/turn with a bend diameter of 10 mm at the wavelength of 850 nm. By contrast, standard multimode fiber with 1% core delta and 25 mm core radius can be expected to exhibit a bend loss of about 1 dB/turn with a bend diameter of 10 mm at the wavelength of 850 nm.

Table 1 lists profile characteristics of Examples 1-6.

TABLE 1

| | Example | | | | | |
|---|---|---|---|---|---|---|
| | 1 | 2 | 3 | 4 | 5 | 6 |
| $\Delta_{1MAX}$(%) | 1.2 | 1.25 | 1.25 | 1.0 | 1.0 | 1.0 |
| $R_1$ (μm) | 25 | 25 | 25 | 25 | 25 | 26 |
| $\Delta_{2MIN}$(%) | 0 | 0 | 0 | −0.15 | −0.1 | −0.4 |
| $R_2$ (μm) | 35 | 35 | 35 | 32 | 32 | 34 |
| $\Delta_{3MAX}$(%) | 0.2 | 0.25 | 0.25 | 0 | 0 | 0 |
| core α | 2.06 | 2.06 | 2.06 | 2.054 | 2.04 | 2.053 |

Improvements of fibers corresponding to embodiments of the invention can also be illustrated by bandwidth, wherein bandwidth is defined herein as the half-power frequency of the transfer function over a distance of 1 km. When intramodal dispersion is neglected, the transfer function is $$G(\omega) = \sum_n a_n \exp(i\omega\tau_n)$$

Where $\tau_n$ denotes the delay time (in the unit of μs/km) for n-th mode, $a_n^2$ is the power of the n-th mode, ω is the angular frequency of the light, and i is the imaginary number so that $i^2 = -1$. There are many ways to specify the power for each mode depending on the power that can be launched into each mode. As a rule of the thumb, we assume a relationship between the power of the n-th mode and mode number, Q, such that:

$$a_n^2 = \begin{cases} 1 - Q/18 & Q <= 18 \\ 0 & Q > 18 \end{cases}$$

The average delay is calculated as:

$$\tau_{av} = \sum_n a_n \tau_n \Big/ \sum_n a_n$$

And rms delay ($\tau_{RMS}$) is calculated as:

$$\tau_{RMS} = \left[\sum_n a_n(\tau_n - \tau_{av})^2 \bigg/ \sum_n a_n\right]^{1/2}$$

The bandwidth is then calculated as:

$$BW = \frac{1}{2\pi\tau_{RMS}}$$

Figure 18:
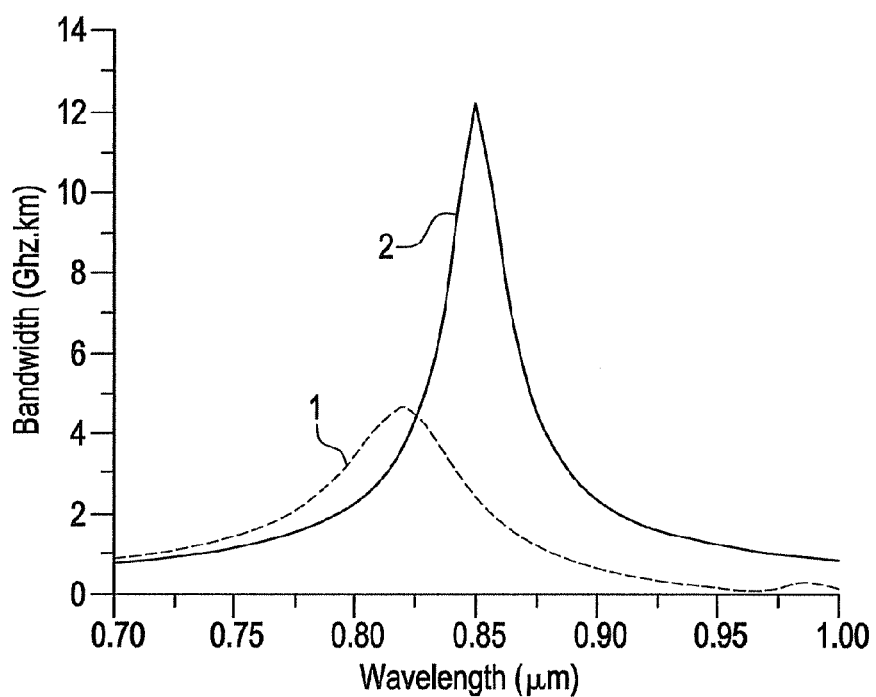
FIG. 18 shows bandwidth versus wavelength for the optical fiber profile of FIG. 2 and the optical fiber profile of FIG. 12.

FIG. 18 shows bandwidth versus wavelength for the fiber of Comparative Example 1 (labeled curve 1) and the fiber of Example 4 (labeled curve 2). As shown in FIG. 18, the fiber of Example 4 has higher bandwidth over a wide range of wavelength. In addition, flood doping a relatively constant level of fluorine from the center of the fiber to slightly beyond the fiber core is a relatively straightforward implementation of the OVD process.

Figure 19:
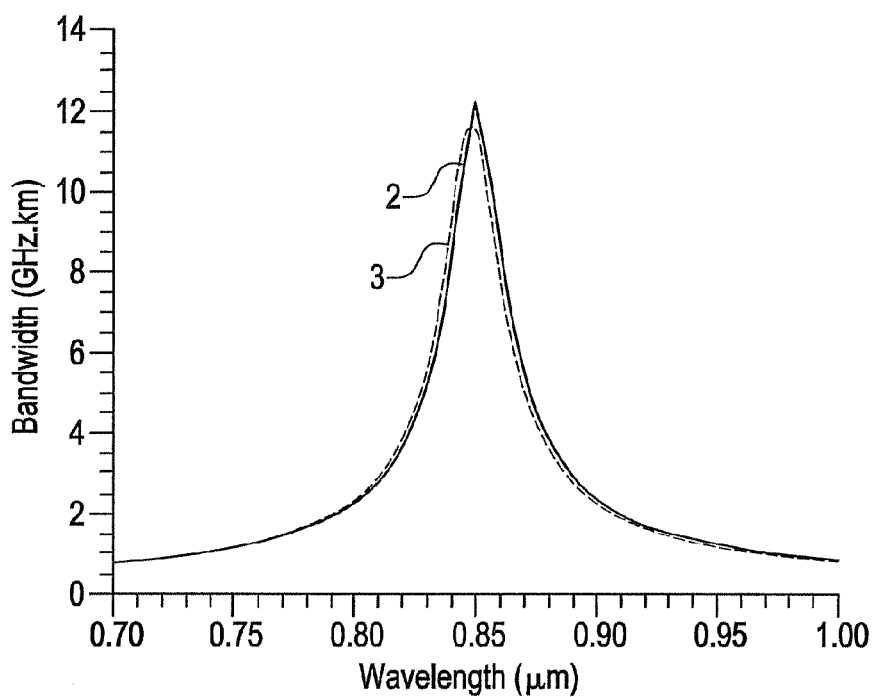
FIG. 19 shows bandwidth versus wavelength for the optical fiber profile of FIG. 12 and a modified version of the optical fiber profile of FIG. 6.

FIG. 19 shows bandwidth versus wavelength for the fiber of Example 4 (labeled curve 2) and a modified version of the fiber of Example 1 (labeled curve 3). The refractive index profile of the modified version of Example 1 is the same as the profile of FIG. 6 except the core alpha is 2.054 and $\Delta_{3MAX}$ is 0.15%. As shown in FIG. 19, the fiber of Example 4, using fluorine flood doping, performs similarly with respect to bandwidth versus wavelength as the modified fiber of Example 1, using $GeO_2$ up-doping in the cladding.

In preferred embodiments, multimode optical fiber can be provided that has a bandwidth of greater than 2 GHz-km at all wavelengths between 800 and 900 nm, such as a bandwidth of greater than 3 GHz-km at all wavelengths between 825 and 875 nm, and further such as a bandwidth of greater than 4 GHz-km at all wavelengths between 825 and 875 nm. In preferred embodiments, multimode optical fiber can be provided that has a bandwidth of greater than 2 GHz-km at a wavelength of about 850 nm, such as a bandwidth of greater than 4 GHz-km at a wavelength of about 850 nm, further such as a bandwidth of greater than 5 GHz-km at a wavelength of about 850 nm, and even further such as a bandwidth of greater than 6 GHz-km at a wavelength of about 850 nm, and yet even further such as a bandwidth of greater than 8 GHz-km at a wavelength of about 850 nm, and still yet even further such as a bandwidth of greater than 10 GHz-km at a wavelength of about 850 nm.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. A graded index multimode optical fiber comprising:
a core region extending radially outwardly from a centerline to a radius $R_1$ and having a positive relative refractive index percent profile $\Delta_1(r)$, wherein the core region has a maximum relative refractive index percent, $\Delta_{1MAX}$;
a first annular cladding region surrounding and directly adjacent to the core region and extending to a radius $R_2$, having a width $W_2$ of $R_2-R_1$, and having a relative refractive index percent profile $\Delta_2(r)$, with a minimum relative refractive index percent, $\Delta_{2MIN}$;
a second annular cladding region surrounding the first annular cladding region and having a relative refractive index percent profile, $\Delta_3(r)$, with a maximum relative refractive index percent, $\Delta_{3MAX}$;
wherein $\Delta_{3MAX}$ is $\geq 0.05\%$, 5 μm$\leq W_2 \leq$10 μm; and $R_1 \geq$20 μm.

2. The optical fiber of claim 1, wherein $W_2$ is greater than 7.5 μm.

3. The optical fiber of claim 1, wherein $\Delta_{1MAX}$ is greater than 1.00%.

4. The optical fiber of claim 1, wherein $0.50\% \leq \Delta_{1MAX} \leq 1.00\%$.

5. The optical fiber of claim 1, wherein the core region has an alpha (α) between 1.8 and 2.5.

6. The optical fiber of claim 1, wherein $0.15\% \leq \Delta_{3MAX} \leq 0.5\%$.

7. The optical fiber of claim 1, wherein said first annular cladding region has a minimum relative refractive index percent, $\Delta_{2MIN}$, of at least 0%.

8. The optical fiber of claim 1, wherein the optical fiber is capable of guiding at least two mode groups at a wavelength of 850 nm, wherein the maximum differential delay between the fastest and slowest guided mode groups at a wavelength of 850 nm is less than 5 ns/km.

9. The optical fiber of claim 1, wherein the optical fiber provides a bandwidth of greater than 2 GHz-km at a wavelength of about 850 nm.

10. The optical fiber of claim 1, wherein $\Delta_3(r)$ alternates between at least one region of higher relative refractive index and at least one region of lower relative refractive index, wherein in at least one region of higher relative refractive index, $\Delta_3(r)$ has a maximum relative refractive index percent of $\Delta_{3MAX}$ and in at least one region of lower relative refractive index, $\Delta_3(r)$ has a minimum relative refractive index percent, $\Delta_{3MIN}$, of about 0, and wherein the at least one region of higher relative refractive index and the at least one region of lower relative refractive index each independently have radial widths of at least 5 μm.

* * * * *